June 6, 1961
G. W. OAKES
2,987,692
ELECTRIC PLUG
Filed June 27, 1956
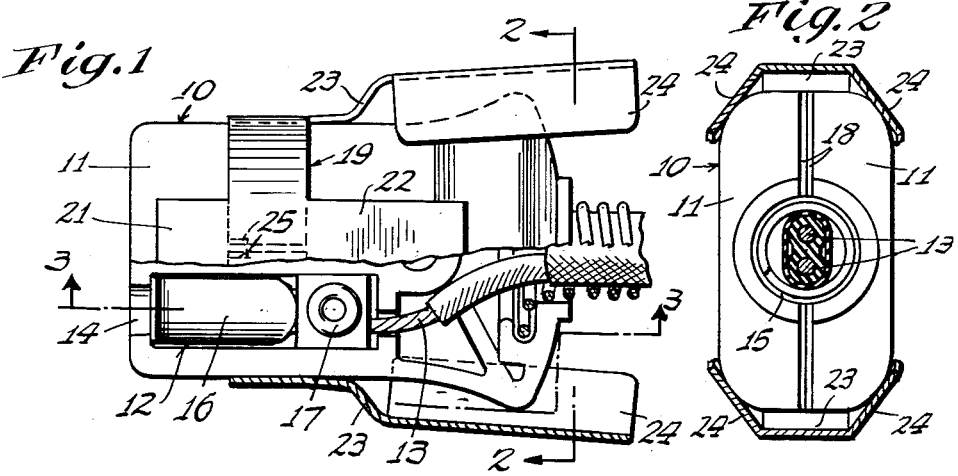
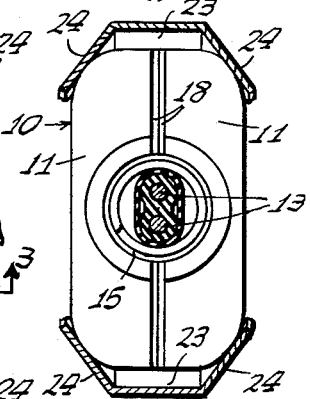
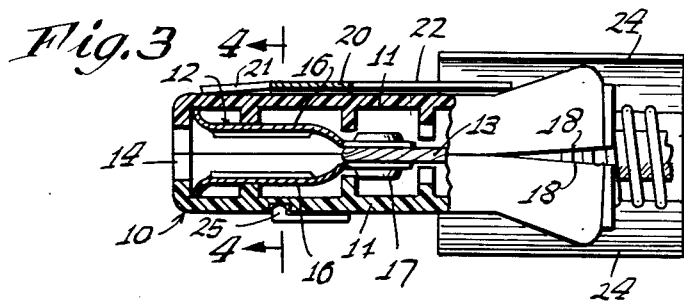
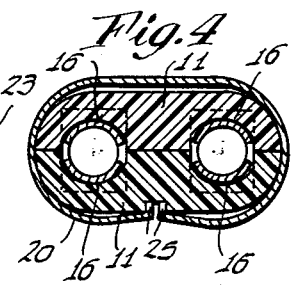
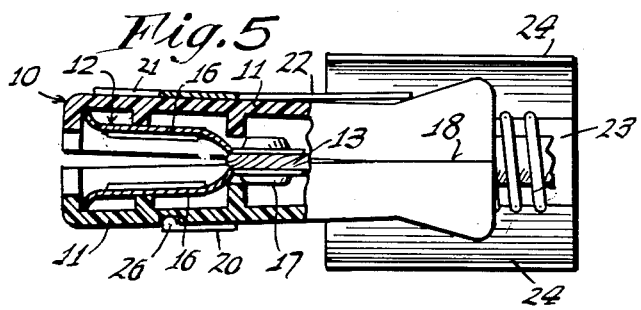
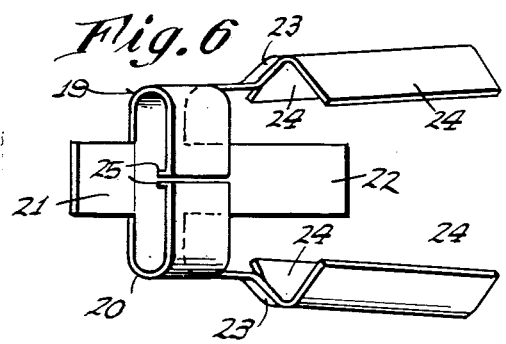
INVENTOR.
George W. Oakes
BY
Arthur A. March
ATTORNEY

# United States Patent Office 2,987,692
Patented June 6, 1961

2,987,692
ELECTRIC PLUG
George W. Oakes, Oakes Products Incorporated,
Crystal City, Mo.
Filed June 27, 1956, Ser. No. 594,256
4 Claims. (Cl. 339—74)

This invention relates to an electric plug and closely analagous devices.

In accordance with the present invention there is provided an electric plug or the like which may be readily engaged to establish electric connection and disengaged to disestablish electric connection without damage to the plug or the like and connected parts, and without injury to the user.

An object of the present invention is the provision of an electric plug whose spring contact members, in a simple manipulation, by a person using one hand, may be actuated so that the contact members may be made to easily receive the electric terminals of a utensil or appliance and then forcibly grip said terminals for feeding electric current; and so that the contact members also may be easily released from said terminals, with the result that the plug and its extension cord are not subjected to damaging strains, and the user in detaching or separating the plug from a heated utensil or appliance will not be burned.

A further object of this invention is the provision of an electric plug with an insulator casing having half-sections which are rockable to serve as levers in cooperation with the spring contact members enclosed within said casing in a normally biased open terminal releasing position, for the purpose of receiving, gripping and releasing the electric terminals or binding posts of a utensil or appliance.

A further object of this invention is the provision in an electric plug of novel means which eliminates the use of screws and nuts for retaining the casing half-sections of the plug in a proper mating relationship to each other, and which further function to operate said half-sections for the purpose of electrically connecting the plug with a cooperative device and for disconnecting the plug therefrom.

It is also within the present invention to provide electric plugs which are adapted for convenient use with utensils or appliances having a handle disposed above the socket of the utensil or appliance in close proximity thereto which ordinarily makes it difficult to engage the electrodes within the socket.

With the foregoing, other objects and advantages of the invention will appear from the embodiments thereof illustrated in the accompanying drawings, in which:

FIG. 1 is a plan view of an electric plug embodying the present invention, portions being broken away and parts being shown in section.

FIG. 2 is a sectional view taken on the line 2—2 of FIG. 1.

FIG. 3 is a sectional view taken on the line 3—3 of FIG. 1.

FIG. 4 is a sectional view taken on the line 4—4 of FIG. 3.

FIG. 5 is a view like FIG. 3, but showing the half-sections of the plug casing rocked into the position and the spring contact members of one of the electrode clips in their open position for receiving or releasing an electrode.

FIG. 6 is a perspective view of the retaining and actuable device of the plug shown in FIGS. 1 to 5.

In FIGS. 1–5 of the drawings there is shown an electric plug as one embodiment of the present invention. The plug includes a casing 10 composed of similar upper and lower complementary mating half-sections 11 which are made of electric insulating material. The half-sections 11 have interior recesses parallel to each other which accommodate a pair of clips 12 so as to be housed within the casing 10 to receive and grip the electrodes or terminals of an electric utensil, appliance or other devices to which electric current is to be supplied by means of an extension cord with the usual wire conductors 13. The half-sections 11 form openings 14 in the forward end of the casing 10 to enable the aforesaid electrodes or terminals to be engaged by the clips 12. An opening 15 formed by the half-sections at their flared rear ends accommodate the extension cord.

Each of the clips 12 in the present instance is made from a single piece of inherently springy conducting material, and comprises a pair of spring contact members 16. Each of the members 16 is fluted for a portion of its length, with outwardly curled forward ends and inwardly offset rear ends joined by a bight. The clips 12 are electrically connected with the conductors 13 respectively. Each of the conductors 13 has a looped end arranged between the rear ends of the related contact members 16. A rivet or eyelet 17 extending through the looped end of the conductor and rear ends of the contact members binds the latter to the conductor in electrical connection therewith.

In accordance with the present invention, the contact members of each clip 12 are normally biased to open position for disestablishing electric connection and may be flexed towards each other for establishing electric connection.

Also in accordance with this invention, the opposed faces of the half-sections 11, at the rearward end of the casing 10 are beveled, as at 18, so that said half-sections, arranged and held in mating relation to each other, may have rocking movement with respect to the forward portions of the contact members 16. Thus the half-sections 11 serve as levers fulcrumed on each other.

An important feature of the present invention is the use of a novel device 19 for separably retaining the half-sections 11 of the casing 10 in complementary and mating relation to each other, and also for causing the rocking movement of the half-sections 11, whereby the contact members 16 may be made to receive, grip and release the electrodes of a utensil or appliance. The device 19 is applicable to the casing half-sections 11 in its entirety arranged exteriorly thereof. The device 19 is made of a single piece of spring steel sheet metal. It comprises a split spring band 20, a forwardly extending leaf spring 21 integral with the band 20, a rearwardly extending leaf spring 22 integral with the band 20, and side rearwardly extending leaf springs 23 constituting manipulators integral with the band 20 and having oblique upper and lower cam portions 24. The band 20 conforms to the cross-sectional shape of the half-sections 11 laid one on the other in the mating relation. The opposed ends of the band 20 each has a projection 25. When the device 19 is slid into a functioning position on the casing half-sections 11, the band 20 tightly embraces the half-sections, with the springs 21 and 22 contacting the upper half-section, and the projections 25 engaged in a depression or hole in the lower half-section. The projections 25 serve to prevent unintentional separation of the device 19 from the casing 10. The springs 23 have their major portions offset in a normally spaced relation to the half-sections 11, so that the cam portions 24 are normally out of contact with the respective half-sections, but disposed to act thereon as the springs 23 are subjected to pressure which flexes them laterally towards each other. The device 19 serves not only for retaining the casing half-sections 11 mated to each other and for rocking them, and also eliminates the use of screws and nuts for retaining the half-sections mated.

When it is desired to establish electric connection of the plug with an electric utensil, such as an electric coffee percolator, skillet, pressing iron and other units, the springs 23 are flexed towards each other with one hand by a person. Then the cam portions 24 acting on the flared ends of the half-sections 11 cause them to rock, thereby tensioning the band 20 and enabling the contact members 16 to assume their open position so as to easily receive the electrodes of the utensil. When pressure on the springs 23 is withdrawn the cam portions 24 are moved clear of the half-sections by the reactions of the springs 23. Consequently, the half-sections 11 under the influence of the band 20 and spring 21 cause the half-sections to rock and thereby flex the contact members 16 of each clip 12 towards each other with the result that the contact members forcibly grip the respective terminals of the utensil and establish electric connection with said terminals. Obviously, the plug may be electrically engaged with the terminals or electrodes of a utensil or appliance without first manipulating the springs 23. To separate or disconnect the plug from the terminals or electrodes, the springs 23 are manipulated causing the contact members 16 to assume their open position and so release the terminals or electrodes for easy separation of the plug from the utensil or appliance.

The plug shown in FIGS. 1–5 is preferable for use with utensils having a handle in close proximity to the socket electrodes or prongs above the latter, because the springs 23 may be manipulated laterally.

It is to be understood that electric plugs and the like embodying the present invention may be made in different sizes, and that details of construction may be modified and rearranged in accordance with the scope of the invention as defined in the appended claims.

I claim:

1. An electric plug comprising a casing composed of half-sections of electric insulating material, said half-sections being formed with abutting bearing portions at least one of which is raised intermediate the ends of the half sections so that one half section may have rocking movement with respect to other half-section; a pair of spring contact members enclosed within said casing and normally biased to open position for disestablishing electric connection but which are operatively yieldable to be flexed into a gripping relation to each other to establish electric connection, and a device which maintains said half-sections cooperatively associated with each other so that said contact members are flexed by said half-sections into said gripping relation, but which half-sections may be rocked to enable said contact members to assume their open position, said device being manipulatable to cause the rocking movement aforesaid, whereby said contact members are enabled to assume their open position and subsequently forced into their gripping relation, the said device comprising a spring band which conforms to the cross-sectional shape of said half-sections when the same are arranged one on the other, and comprising leaf springs constituting manipulators integral with said band and extending rearwardly therefrom at opposite sides respectively of said casing and normally out of contact with said half-sections of the casing, each of said leaf springs having cam portions which act on said half-sections as the leaf springs are manually pressed laterally toward each other, thereby causing the aforesaid rocking movement for the stated purposes.

2. A device for use in separably retaining the rockable half-sections of the casing of an electric plug in a complemental mating relation to each other, comprising a split spring band, a forwardly extending leaf spring integral with said band, and side leaf springs constituting manipulators integral with said band and extending rearwardly therefrom at opposite sides thereof respectively, and each of said side leaf springs having upper and lower cam portions integral therewith.

3. A device as in claim 2, wherein a projection is provided on each end of said split band to form stops for preventing said split band from becoming separated from said casing.

4. An electric plug comprising a casing composed of elongated half-sections made of electric insulating material, said section having intermediate their ends abutting bearing portions at least one of which is raised, by which the sections are rockable with respect to each other, said bearing portions consituting raised fulcrum means to effect the said rockable relation, a pair of two-part spring contact clips adapted to engage cooperable contact prongs of an electric appliance, said clips being housed within said casing, the parts of said clips being normally biased to open spread-apart positions, wherein they are disposed to be spaced away from the cooperable contact prongs for disestablishing electric connection, said parts being operable by the rocking movement of said half-sections into a closed position for engaging the prongs and establishing electric connection thereto, and a split spring band slidable into and out of embracing engagement with one set of corresponding end portions of said half-sections so as to retain them in a complementary mating relation with said spring clips in closed position and to resiliently resist rocking movement of said half-sections so as to yieldably retain said spring clips in their closed position, said band carrying manually engageable means to which the finger pressure of one hand may be applied, for transmitting pressure to the other set of corresponding ends to rock the half-sections for releasing the clips for opening movement, said manually engageable means comprising a pair of leaf springs that are connected with said spring band in opposed relation to each other, said leaf springs being positioned to overlie the meeting edges of said half-sections and each leaf spring having cam portions that engage said half-sections whereby when said manually engageable means are pressed laterally toward each other, rocking movement of said half-sections occurs, thereby enabling said spring contact clips to assume their open position, and means for resiliently retaining the band on said half-sections.

References Cited in the file of this patent

UNITED STATES PATENTS

| | | |
|---|---|---|
| 1,169,314 | Zannoth | June 25, 1916 |
| 1,220,780 | Ovington | Mar. 27, 1917 |
| 1,923,901 | Winkie | Aug. 22, 1933 |
| 2,011,066 | McArdle et al. | Aug. 13, 1935 |
| 2,063,110 | McArdle | Dec. 8, 1936 |
| 2,159,139 | Eaton | May 23, 1939 |